MUSIC SYNTHESIZER KEYBOARD
Original Filed Dec. 17, 1970
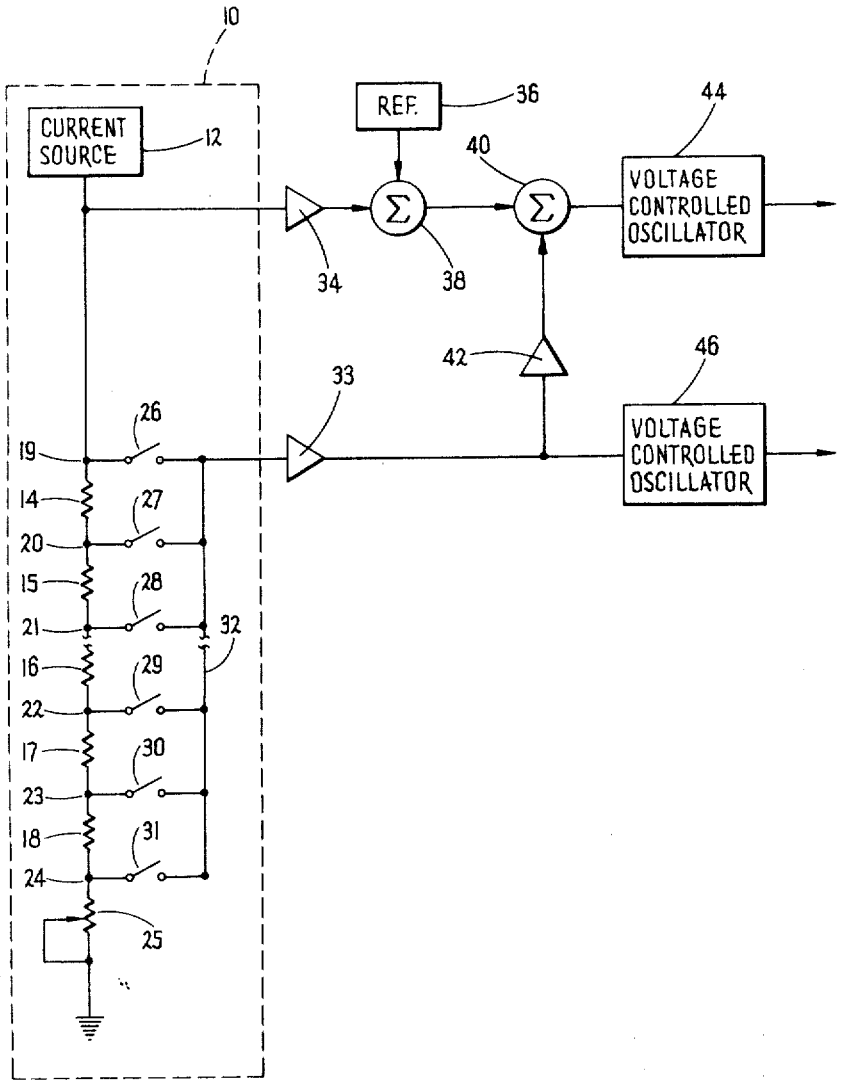

United States Patent Office

Re. 27,983
Reissued Apr. 23, 1974

27,983

MUSIC SYNTHESIZER KEYBOARD

Richard E. Stearns, Sharon, Mass., assignor to ARP Instruments, Inc., Newton, Mass.

Original No. 3,665,089, dated May 23, 1972, Ser. No. 99,193, Dec. 17, 1970. Application for reissue Aug. 7, 1972, Ser. No. 278,190

Int. Cl. G10h *1/00*

U.S. Cl. 84—1.01 6 Claims

Matter enclosed in heavy brackets [ ] appears in the original patent but forms no part of this reissue specification; matter printed in italics indicates the additions made by reissue.

ABSTRACT OF THE DISCLOSURE

The invention concerns a musical keyboard for providing a two-voiced output from a music synthesizer. The system includes a voltage divider which provides a plurality of values of potential and a plurality of switches each connected to a divider tap at a unique one of the potential values. The simultaneous closure of a plurality of switches applies the selected voltage to a pair of voltage-controlled oscillators so as to provide a two-voiced output determined by the two selected voltages having the greatest and least absolute amplitude values.

RELATED APPLICATION

This invention is a reissue application of Pat. No. 3,665,089 issued on May 23, 1972.

This invention relates to electronic musical instruments and more particularly to music synthesizers. The so-called music synthesizers currently available today are monophonic, i.e. only one note at a time may be played. The usual keyboard system of these monophonic synthesizers comprises a series string of precision resistors driven by a constant current source. For the normal musical scale, the circuitry is adjusted to produce a 1/12 volt drop across each resistor in the string. Depression of a key connects a busbar to a point along the resistor string, applying the voltage at that point to the input of a buffer amplifier (Unity gain follower). The latter, in turn, drives a voltage-controlled oscillator to the appropriate frequency for the key depressed. If two keys are depressed simultaneously, only the note corresponding to the lower frequency key will sound.

A primary object of the present invention is to provide a plural-voiced music synthesizer. Another object of the present invention is to provide a synthesizer keyboard system capable of playing two notes simultaneously. Yet another object of the present invention is to provide a keyboard system capable of simultaneously playing the two selected notes corresponding to the highest and lowest frequency value significance of the keys played.

The above objects, advantages, and features of the present invention, as well as others, are accomplished by providing a music synthesizer keyboard system for providing a plural-voiced output and comprising means for providing a scaled sequence of signals of differing absolute values each corresponding to a respective key on said keyboard. Means are also provided, responsive to the signals, such that simultaneous selection of more than one of the signals will provide a two-voiced output determined by the two selected signals having the greatest and least absolute values.

Other objects of the invention will in part be obvious and will in part appear hereinafter. The invention accordingly comprises the apparatus possessing the construction, combination of a elements, and arrangement of parts which are exemplified in the following detailed disclosure, and the scope of the application of which will be indicated in the claims.

For a fuller understanding of the nature and objects of the present invention, reference should be made to the following detailed description taken in connection with the accompanying drawing wherein is shown a diagram of a network for use in a music synthesizer, partly in block form and particularly schematic.

The drawing is essentially of a network in which a manually operable keyboard is shown schematically within block 10 enclosed in broken lines. Means are included for providing a plurality of signals of differing absolute amplitudes, scaled preferably according to the frequency relationships of the standard musical half tone scale. Thus, for example, one of the signals may correspond to A above middle C (or, as will be seen later, has an amplitude which will control an appropriate oscillator to produce the requisite audio frequency of 440 cps) and other signals will then correspond to higher octaves or harmonics in which the A tone will be double, triple, etc. the lower frequency, as well-known in the art.

To this end there is provided a voltage divider comprising source 12, preferably of constant current, connected to a string of series connected precision resistors 14, 15, 16, 17, and 18 scaled in ohmic values to provide the desired signal relation by way of the voltage drop across the resistors. The other end of the string of resistors is grounded or held at a fixed level. The number of resistors shown is merely exemplary and preferably is one less than the number of signals (or tones) desired. *The drawing illustrates five resistors and the resistor string is broken to indicate that six additional resistors can be provided for a full octave.* To provide access to the signals or voltages thus provided, tap 19 is disposed between source 12 and resistor 14, and similar taps 20, 21, 22, 23, and 24 are respectively provided between resistors 14 and 15, resistors 15 and 16 resistors 16 and 17, resistors 17 and 18, and at [ground or] some arbitrary level set by variable rheostat 25.

Connected to each of taps 19, 20, 21, 22, 23, and 24 is a respective key-operated switch shown typically as mechanical single-pole, single throw switches 26, 27, 28, 29, 30, and 31, although any other type of switch can be employed as well. All of the output terminals of these switches are connected to a common bus 32 which in turn is connected to the input of amplifier 33.

Tap 19 is also connected to the input of inverting amplifier 34. Source 36 of reference potential is provided, and its output and the output of amplifier 34 are connected together to inputs of summing circuit 38. The output of summing circuit 38 is connected to an input of another summing circuit 40. The output from amplifier 33 is likewise connected to an input of summing circuit 40 through a buffer means such as amplifier 42. The output from summing circuit 40 is connected to the control input of voltage-controlled oscillator 44. The output of amplifier 33 is connected to the control input of voltage-controlled oscillator 46. Summing circuits 38 and 40, buffer amplifier 42, amplifiers 33 and 34, and voltage-controlled oscillators 44 and 46 may be selected from any one of a number of standard circuit configurations well-known in the art, and particularly the amplifiers and summing circuits can be appropriate types of well-known operational amplifiers.

Operation of the electronic music system 10 shown in the drawing will now be described. Source 12 supplies a preferably constant current to junction 19 to which the string of series-connected resistors 14, 15, 16, 17, and 18 of keyboard 10 is connected. These resistors provide a number of different voltages at each of taps *19* 20, 21, 22, 23, and 24. Closure of one of switches 26, 27, 28, 29, 30, or 31 connects the corresponding tap to bus 32 and thus applies the voltage at that tap to the input of amplifier 33. For example, closure of switch 27 applies the voltage at tap 20 to the input of amplifier 33.

Reference source 36 is selected to provide a potential of the same absolute amplitude as the voltage at the head of the divider (i.e. at tap 19) but of the opposite polarity to the output of amplifier 34. Therefore, when only one switch, such as, for example, 27 is closed, the input signals to summing circuit 38 are equal and opposite so the output of circuit 38 is substantially zero. The voltage at tap 20, which is less than that at tap 19 by the IR drop across resistor 14, will thus be applied both to the input of oscillator 46 directly from amplifier 33 and to the input of oscillator 44 via amplifier 33, buffer amplifier 42, and summing circuit 40. Assuming that amplifier 42 and summing circuit 40 exhibit a total gain of unity, oscillators 44 and 46 will have identical input signals and, if the oscillators too are identical, these inputs should provide the same frequency outputs.

When any two switches of keyboard 10 are closed simultaneously, the resistors between the two closed switches are shorted out, causing the voltage at tap 19 to drop by an amount equal to the sum of the voltage drops across each shorted resistor. This voltage appearing at tap 19 is applied to amplifier 34 and then summed in summing circuit 38 together with the voltage from reference source 36. The output from summing circuit 38 will be the difference between the voltages from amplifier 34 and source 36. Meanwhile, the voltage applied at the input of amplifier 33 is the voltage from the tap of lowest voltage connected to an actuated switch. The output voltage from amplifier 33 is simultaneously applied to oscillator 46 and via buffer amplifier 42 to summing circuit 40 where it is summed together with the difference voltage from summing circuit 38 to provide a voltage corresponding to the voltage from the tap of highest voltage connected to an actuated switch. This summed voltage from summing circuit 40 is applied to oscillator 44. The result is that the oscillator 44 will provide a frequency output corresponding to the actuated key for the higher note, and oscillator 46 will provide a lower frequency output corresponding to the actuated key or switch for the lower note.

For example, one may assume that the resistors in the voltage divider and the output of the current source are such that the voltage drop across the divider is one volt per octave of frequency of the output of oscillator 46 and thus 1/12 volt across each resistor in the divider. One can also assume that the voltages thus switched by switches 26, 27, 28, 29, 30, and 31 respectively are capable of generating in oscillator 46 the audio frequencies in half tones from middle C down to G below middle C. Lastly, assume that the normal voltage of current source 12 is +4 volts, the voltage from reference source 26 is +4 volts, that all amplification and summing is with unity gain, that only amplifier 34 inverts and that oscillators 44 and 36 are identical.

The following table shows some examples of resulting outputs from the simultaneous closing of two selected keyboard switches with the same parameters given above. $V_1$ is the voltage appearing at tap 19 upon the simultaneous closure of the two switches. $V_2$ is the voltage appearing at the input of amplifier 33 upon the simultaneous closure of the same two switches. $V_2$ is the voltage appearing at the input of amplifier 33 upon the simultaneous closure of the same two switches. Δ is the output voltage of summing circuit 38 and represents the difference between the output voltage from amplifier 34 and the voltage provided by reference source 36. The column labelled V44 represents the voltages applied to oscillator 44 which is the sum of $V_2 + \Delta$, and the column labelled T44 is the tone produced by oscillator 44. The column labelled V46 represents the voltages applied to oscillator 46, T46 being the tone of the note generated.

TABLE I

| Closed switches | | $V_1$ | $V_2$ | V44 | T44 | V46 | T46 |
|---|---|---|---|---|---|---|---|
| 26 | 27 | 3 11/12 | 3 11/12 1/12 | 4 | C | 3 11/12 | B. |
| 26 | 28 | 3 10/12 | 3 10/12 2/12 | 4 | C | 3 10/12 | B flat. |
| 26 | 29 | 3 9/12 | 3 9/12 3/12 | 4 | C | 3 9/12 | A. |
| 27 | 28 | 3 11/12 | 3 10/12 1/12 | 3 11/12 | B | 3 10/12 | B flat. |
| 27 | 29 | 3 10/12 | 3 9/12 2/12 | 2 11/12 | B | 3 9/12 | A. |
| 28 | 29 | 3 11/12 | 3 9/12 1/12 | 3 10/12 | B flat | 3 9/12 | A. |

It should be noted that the value of Δ is a direct measure of the number of half-tones (in this example) between the two notes sounded and, referred to the voltage representing the note of lower frequency so as to be summed therewith, provides a summed voltage which then must represent the note of higher frequency.

Adjustment of potentiometer 25 will result in shifting all of the voltages at the various taps by the same amount, therefore, can be used to tune a number of voltage divider systems to different octaves.

Since certain changes may be made in the above apparatus without departing from the scope of the invention herein involved, it is intended that all matter contained in the above description or shown in the accompanying drawing shall be interpreted in an illustrative and not in a limiting sense.

What is claimed is:

1. In an electronic system, in combination:

means for providing a plurality of voltages of different values;

means for selecting at least two of said voltages substantially simultaneously;

means for providing a reference voltage;

means for deriving a difference signal from the values of said reference voltage and one of the selected voltages;

means for deriving an output signal from the values of said difference signal and the other of said selected voltages, and means for generating two signals having frequencies in accordance respectively with the values of said output signal and said other of said selected voltages.

2. In a system as defined in claim 1, wherein said means for providing said plurality of voltages comprises a voltage divider, and said means for selecting comprises a plurality of switching means each having an input terminal connected to a respective tap in said divider, the output terminals of all of said switching means being connected to a common bus.

3. In a system as defined in claim 2 wherein said difference signal is proportional to the voltage drop along said divider between the taps closest to opposite ends of said divider and connected to at least two corresponding switching means in closed condition.

4. In a system as defined in claim 1 wherein said output signal is a voltage and said means for generating two signals comprises a pair of voltage-controlled oscillators.

5. Electronic musical apparatus comprising, in combination:

a voltage divider having a plurality of tags each adapted to have a unique voltage thereon selected in order from a set of voltage levels which progressively increase in said order from a predetermined initial minimum amplitude, a like plurality of key-operated switches each having an input terminal connected to a corresponding tap, all output terminals of said switches being coupled to a common bus, a source of reference voltage, means for summing said reference voltage with a first signal derived from the maximum voltage level on said taps when one or more of said switches are closed so as to produce a difference signal;

first and second oscillators for providing output signals having frequencies variable in accordance with variations in respective control signals;

means for applying to said first oscillator a first control signal derived from the lowest voltage level of the taps connected to closed ones of said switches;

means for summing said difference signal with said first control signal so as to derive a second control signal; and means for applying said second control signal to said second oscillator.

6. Apparatus as defined in claim 5 wherein said difference signal is proportional to the voltage drop along said divider between the tap coupled to the closed switch corresponding to the maximum voltage level selected on the divider and the tap coupled to the closed switch corresponding to said lowest voltage level.

The following reference, cited by the Examiner, are of record in the patented file of this patent or the original patent.

References Cited

UNITED STATES PATENTS 3,288,904 11/1966 George ---------- 84—1.01

RICHARD B. WILKINSON, Primary Examiner

U. WELDON, Assistant Examiner

U.S. Cl. X.R.

84—1.17, 1.24